(12) United States Patent
Zhong et al.

(10) Patent No.: US 12,177,613 B2
(45) Date of Patent: Dec. 24, 2024

(54) ULTRA-SHORT-THROW PICTURE AND SCREEN ALIGNMENT METHOD AND APPARATUS, ULTRA-SHORT-THROW PROJECTION DEVICE, AND MEDIUM

(71) Applicant: CHENGDU XGIMI TECHNOLOGY CO., LTD., Sichuan (CN)

(72) Inventors: Bo Zhong, Sichuan (CN); Shi Xiao, Sichuan (CN); Xin Wang, Sichuan (CN); Lizao Zhang, Sichuan (CN)

(73) Assignee: CHENGDU XGIMI TECHNOLOGY CO., LTD., Sichuan (CN)

( * ) Notice: Subject to any disclaimer, the term of this patent is extended or adjusted under 35 U.S.C. 154(b) by 202 days.

(21) Appl. No.: 17/442,634

(22) PCT Filed: Mar. 13, 2020

(86) PCT No.: PCT/CN2020/079142
§ 371 (c)(1),
(2) Date: Sep. 24, 2021

(87) PCT Pub. No.: WO2021/093231
PCT Pub. Date: May 20, 2021

(65) Prior Publication Data
US 2022/0262287 A1   Aug. 18, 2022

(30) Foreign Application Priority Data

Nov. 11, 2019   (CN) .................. 2019 1 1094293.3

(51) Int. Cl.
*H04N 9/31* (2006.01)
*G03B 21/14* (2006.01)
(Continued)

(52) U.S. Cl.
CPC ......... *H04N 9/3185* (2013.01); *G03B 21/147* (2013.01); *G06T 7/70* (2017.01);
(Continued)

(58) Field of Classification Search
CPC .... G09G 3/002; G09G 2354/00; G06F 3/167; G06T 7/70; H04N 9/3194; H04N 9/3185; H04N 9/3179; G03B 21/147
See application file for complete search history.

(56) References Cited

U.S. PATENT DOCUMENTS

2010/0259767 A1* 10/2010 Takeuchi ............. H04N 9/3147
356/614
2013/0215138 A1*  8/2013 Suzuki .................. H04N 9/3194
345/593
(Continued)

FOREIGN PATENT DOCUMENTS

CN     101859053 A    10/2010
CN     107547881 A     1/2018
(Continued)

OTHER PUBLICATIONS

International Search Report for corresponding application PCT/CN2020/079142 filed Mar. 13, 2020; Mail date Jul. 29, 2020.
(Continued)

*Primary Examiner* — Magda Cruz
(74) *Attorney, Agent, or Firm* — Samson G. Yu

(57) ABSTRACT

This application provides an ultra-short-throw picture and screen alignment method which includes that: a first lateral projected image and a second lateral projected image are acquired by two cameras when an ultra-short-throw projector projects a picture; image processing is performed on the first lateral projected image and the second lateral projected image to obtain a projection position in a projection area and a screen position in a screen area; and the picture is adjusted according to the screen position and the projection position, so that a position of an adjusted projection picture and a target position coincide. In this application, the projected
(Continued)

images are acquired by the two cameras, thereby ensuring acquisition of complete images.

12 Claims, 3 Drawing Sheets

(51) Int. Cl.
  *G06T 7/70* (2017.01)
  *G06F 3/16* (2006.01)
(52) U.S. Cl.
  CPC .......... *H04N 9/3179* (2013.01); *G06F 3/167* (2013.01); *G09G 2354/00* (2013.01)

(56) References Cited

U.S. PATENT DOCUMENTS

| | | | |
|---|---|---|---|
| 2014/0111492 A1 | 4/2014 | Liang | |
| 2014/0313423 A1* | 10/2014 | Johnson | H04N 9/3194 348/745 |
| 2017/0277358 A1* | 9/2017 | Kihara | G06F 3/04883 |
| 2018/0232855 A1 | 8/2018 | Fukui | |

FOREIGN PATENT DOCUMENTS

| | | | | |
|---|---|---|---|---|
| CN | 108632586 A | | 10/2018 | |
| CN | 108718404 A | | 10/2018 | |
| CN | 108924522 A | * | 11/2018 | .............. H04N 9/31 |
| CN | 109040728 A | | 12/2018 | |
| CN | 109104596 A | | 12/2018 | |
| CN | 110636274 A | | 12/2019 | |
| CN | 110798670 A | | 2/2020 | |
| JP | 2005073182 A | | 3/2005 | |
| JP | 2006005534 A | | 1/2006 | |
| JP | 3996610 B2 | | 10/2007 | |
| JP | 2009223231 A | | 10/2009 | |
| JP | 2010243921 A | | 10/2010 | |
| JP | 2011229121 A | | 11/2011 | |
| JP | 2014134611 A | | 7/2014 | |
| WO | 2016002510 A1 | | 1/2016 | |
| WO | 2016204068 A1 | | 12/2016 | |

OTHER PUBLICATIONS

First Search Report for corresponding CN application No. 201911094293.3.

* cited by examiner

ULTRA-SHORT-THROW PICTURE AND SCREEN ALIGNMENT METHOD AND APPARATUS, ULTRA-SHORT-THROW PROJECTION DEVICE, AND MEDIUM

TECHNICAL FIELD

This application relates to the technical field of ultra-short-throw projectors, in particular to, an ultra-short-throw picture and screen alignment method, an ultra-short-throw picture and screen alignment apparatus, an ultra-short-throw projection device, and a computer-readable storage medium.

BACKGROUND

Since an ultra-short-throw projector has specific characteristics of being close to a projection surface and having a large projection angle, common cameras are used for taking images to achieve picture adjustment in the related art. However, for the common cameras, it is difficult to shoot a full projection screen, and even more difficult to shoot a full projection picture, resulting in low accuracy in positioning of a screen position and a projection picture position, and accordingly, the accuracy of adjusting the picture according to the screen position and projection screen position is low, which is easy to cause the problem of poor display effects of the projection picture.

Therefore, how to provide a solution for solving the above technical problem is a problem that needs to be solved by those skilled in the art at present.

SUMMARY

The objective of this application is to provide an ultra-short-throw picture and screen alignment method, an ultra-short-throw picture and screen alignment apparatus, an ultra-short-throw projection device, and a computer-readable storage medium, for improving accuracy in projection picture adjustment and improving display effects. The specific solution is as follows.

This application discloses an ultra-short-throw picture and screen alignment method, wherein the method includes:
  a first lateral projected image and a second lateral projected image are acquired by two cameras when an ultra-short-throw projector projects a picture;
  image processing is performed on the first lateral projected image and the second lateral projected image to obtain a projection position in a projection area and a screen position in a screen area;
  the picture is adjusted according to the screen position and the projection position, so that a position of an adjusted projection picture and a target position coincide.

As at least one alternative embodiment, acquiring the first lateral projected image and the second lateral projected image by the two cameras may include:
  a corresponding image of a same side area is respectively acquired by two cameras to obtain the first lateral projected image and the second lateral projected image;
  or, a corresponding image of an opposite area is respectively acquired by two cameras to obtain the first lateral projected image and the second lateral projected image.

As at least one alternative embodiment, the picture is a small-scale feature image, wherein the small-scale feature image includes two feature images, and the small-scale feature image is used to be subjected to homography transformation to obtain an original-size image, thereby facilitating picture and screen alignment.

Thus, the feature images in the small-scale feature image are not easy to exceed the screen area. According to the small-scale feature image, a user can also fine tune a position of the ultra-short-throw projection apparatus.

As at least one alternative embodiment, the feature image may include any one of a two-dimensional code image, a bar code image, and an ArUco image.

As at least one alternative embodiment, before acquiring the first lateral projected image and the second lateral projected image by the two cameras when the ultra-short-throw projector projects the picture, the method further including:
  an alignment instruction is received, wherein the alignment instruction includes a voice control alignment instruction.

As at least one alternative embodiment, after adjusting the picture according to the screen position and the projection position, so that the position of the adjusted projection picture and the target position coincide, the method may further includes:
  a deviation value between the position of the adjusted projection picture and the target position is calculated;
  whether the deviation value is smaller than a preset deviation threshold value is judged;
  completion of alignment is determined when the deviation value is smaller than the preset deviation threshold value.

Thus, the completion of alignment is determined through a comparison between the deviation value and the preset deviation value, thereby ensuring the accuracy in picture and screen alignment.

As at least one alternative embodiment, the target position is the screen position.

This application discloses an ultra-short-throw picture and screen alignment apparatus which may include a projected image acquisition module, a processing module, and an adjustment module.

The projected image acquisition module is configured to acquire a first lateral projected image and a second lateral projected image by two cameras when an ultra-short-throw projector projects a picture;

The processing module is configured to perform image processing on the first lateral projected image and the second lateral projected image to obtain a projection position in a projection area and a screen position in a screen area;

The adjustment module is configured to adjust the picture according to the screen position and the projection position, so that a position of an adjusted projection picture and a target position coincide.

As at least one alternative embodiment, the projected image acquisition module may include a first projected image acquisition unit and a second projected image acquisition unit.

The first projected image acquisition unit is configured to acquire a corresponding image of a same side area by two cameras to obtain the first lateral projected image and the second lateral projected image.

The second projected image acquisition is configured to acquire a corresponding image of an opposite side area by two cameras to obtain the first lateral projected image and the second lateral projected image.

This application discloses an ultra-short-throw projection device which may include a memory and a processor.

The memory is configured to store a computer program.

The processor is configured to execute the computer program to implement the steps of the ultra-short-throw picture and the screen alignment method described above.

This application discloses a computer-readable storage medium. A computer program is stored on the computer-readable storage medium, and when executed by a processor, implements the steps of the ultra-short-throw picture and the screen alignment method described above.

This application provides an ultra-short-throw picture and screen alignment method which includes that a first lateral projected image and a second lateral projected image are acquired by two cameras when an ultra-short-throw projector projects a picture; image processing is performed on the first lateral projected image and the second lateral projected image to obtain a projection position in a projection area and a screen position in a screen area; and the picture is adjusted according to the screen position and the projection position, so that a position of an adjusted projection picture and a target position coincide.

Thus, in this application, the projected images are acquired by two cameras, thereby ensuring acquisition of complete images; the projection position and the screen position are obtained by cooperative processing, the picture is adjusted according to the projection position and the screen position, so that the incomplete picture caused by the use of a single camera in the related art is overcome, and accuracy in projection picture adjustment and display effects are improved. This application also provides an ultra-short-throw picture and screen alignment apparatus, an ultra-short-throw projection device, and a computer-readable storage medium all having the above advantages, which will not be elaborated here.

BRIEF DESCRIPTION OF THE DRAWINGS

In order to describe the technical solutions in the embodiments of this application or the conventional art more clearly, the drawings required to be used in the embodiments or the conventional art will be simply introduced below. It is apparent that the drawings in the following descriptions are only embodiments of this application. Those of ordinary skill in the art may further obtain other drawings according to the provided drawings without creative work.

DETAILED DESCRIPTION OF THE EMBODIMENTS

In order to make the objectives, technical solutions, and advantages of the embodiments of this application clearer, the technical solutions in the embodiments of this application will be clearly and completely described below in combination with the drawings in the embodiments of this application. It is apparent that the described embodiments are not all embodiments but part of embodiments of this application. All other embodiments obtained by those of ordinary skill in the art based on the embodiments in the application without creative work shall fall within the scope of protection of the application.

Figure 1:
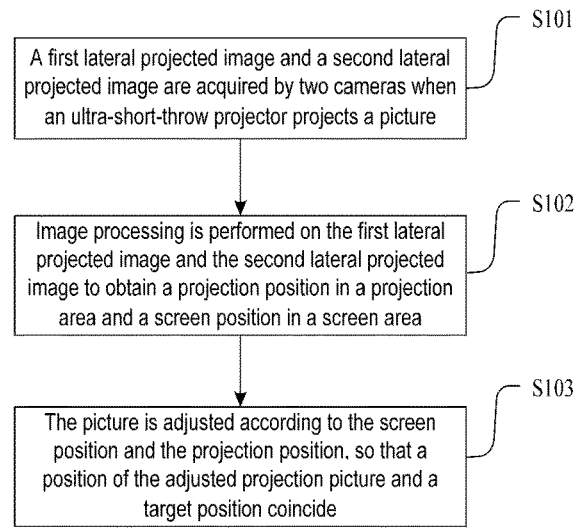
FIG. 1 is a flowchart of an ultra-short-throw picture and screen alignment method according to an embodiment of this application.

Since an ultra-short-throw projector has specific characteristics of being close to a projection surface and having a large projection angle, common cameras are used for taking images to achieve picture adjustment in the related art. However, for the common cameras, it is difficult to shoot a full projection screen, and even more difficult to shoot a full projection picture, resulting in low accuracy in positioning of a screen position and a projection picture position, and accordingly, the accuracy in adjusting the picture according to the screen position and projection screen position is low, which is easy to cause the problem of poor display effects of the projection picture. Based on the above technical problem, the embodiments provide an ultra-short-throw picture and screen alignment method, which can improve accuracy in projection picture adjustment and improve display effects, referring to FIG. 1 for details. FIG. 1 is a flowchart of an ultra-short-throw picture and screen alignment method according to an embodiment of this application, which includes the following operations.

In S101, a first lateral projected image and a second lateral projected image are acquired by two cameras when an ultra-short-throw projector projects a picture.

Figure 2:
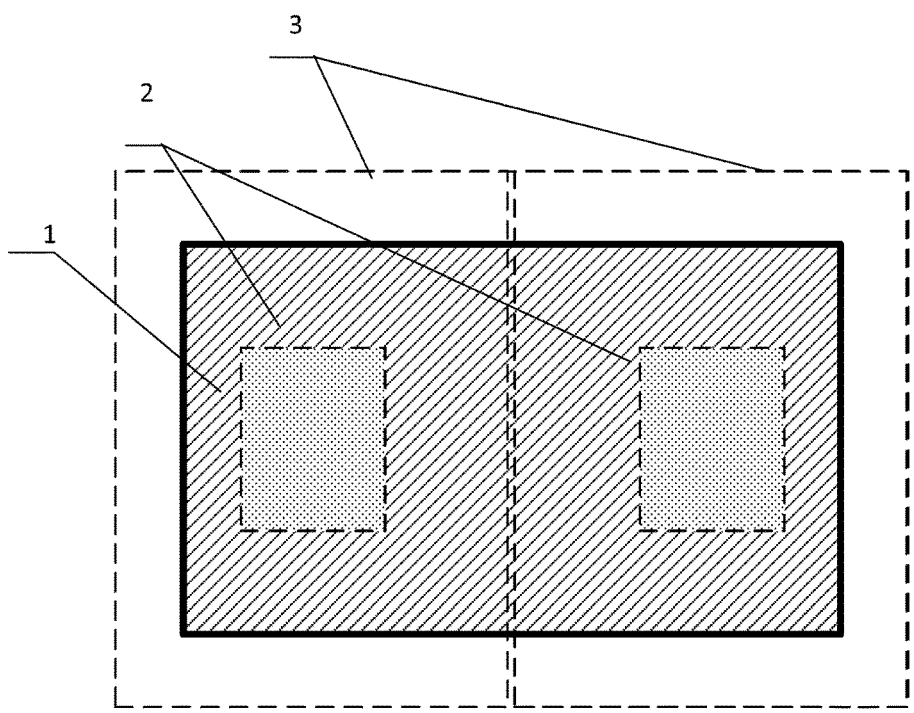
FIG. 2 is a projection diagram of a small-scale feature image according to an embodiment of this application.

A relative position of the picture and the screen is not limited in the embodiment. The picture may completely cover the screen, or the picture may be within the screen, or a part of the picture is within the screen while the other part thereof is out of the screen. In the embodiment, the picture includes, but is not limited to, a regular picture, a feature image, and a small-scale feature image. As an example embodiment, the picture is a small-scale feature image. The small-scale feature image includes two feature images, and the small-scale feature image is used to be subjected to homography transformation to obtain an original-size image, thereby facilitating picture and screen alignment. As an example embodiment, the feature image may include any one of a two-dimensional code image, a bar code image, or an ArUco image. As shown in FIG. 2, FIG. 2 is a projection diagram of a small-scale feature image according to an embodiment of this application, the projected content is an image in a projectable area 3 of the projector; and the image is a small-scale feature image including two feature images respectively located in two small-scale feature image projection areas 2. The feature images in the small-scale feature image are not easy to exceed a screen area 1. According to the small-scale feature image, a user may also fine tune a position of the ultra-short-throw projection device.

In the embodiment, models of the cameras are not limited. While, in order to ensure the accuracy of the screen position and the projection position, as an example, the two cameras are the same.

Figure 3:
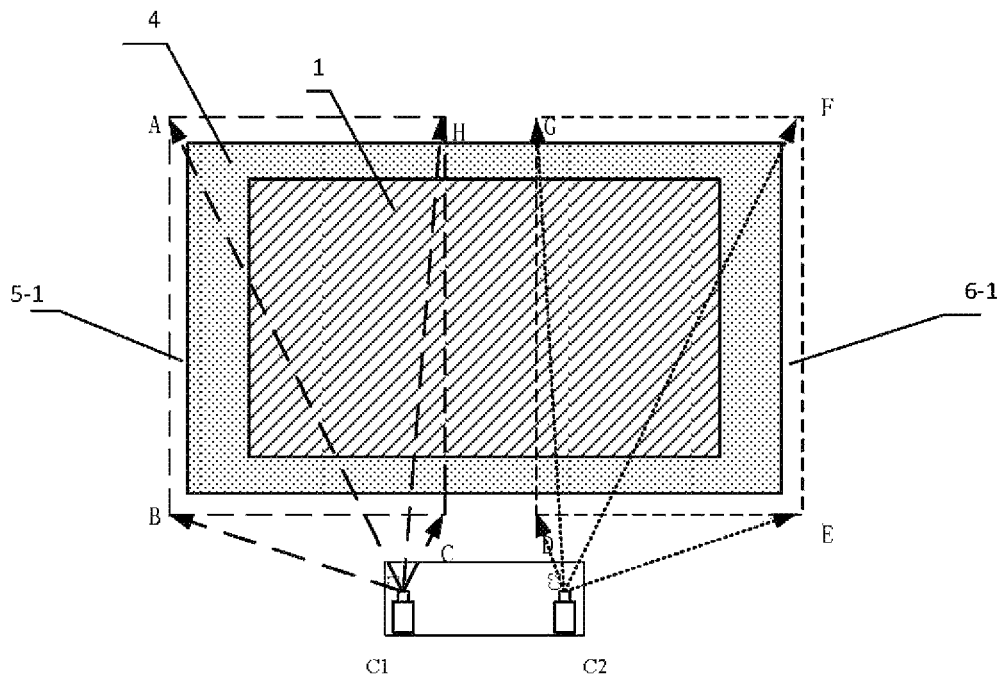
FIG. 3 is schematic diagram showing acquiring images of areas on the same side by double cameras, according to an embodiment of this application.

In an achievable implementation mode, as shown in FIG. 3, FIG. 3 is a schematic diagram showing acquiring images of areas on the same side by double cameras, according to an embodiment of this application, the two cameras are used to acquire the images of the areas on the same side, to obtain a first lateral projected image and a second lateral projected image. As ABCH is a shooting area 5-1 of a camera C1, DEFH is a shooting area 6-1 of a camera C2, and a projection picture area 4 covers two sides of a screen area 1, according to the first lateral projected image, namely an image corresponding to ABCH, positions of two angular points on the left side of the screen may be obtained, and positions of two corresponding angular points A and B of a projection may also be obtained; according to the second lateral projected image, namely an image corresponding to DEFH, positions of two angular points on the right side of the screen may be obtained, and positions of two corresponding angular points E and F of a projection may also be obtained. It can be understood that, the size of the first lateral projected image and the second lateral projected image is not limited in the embodiment, as long as they include the corresponding feature points, which facilitates acquisition of the screen position and the projection position.

Figure 4:
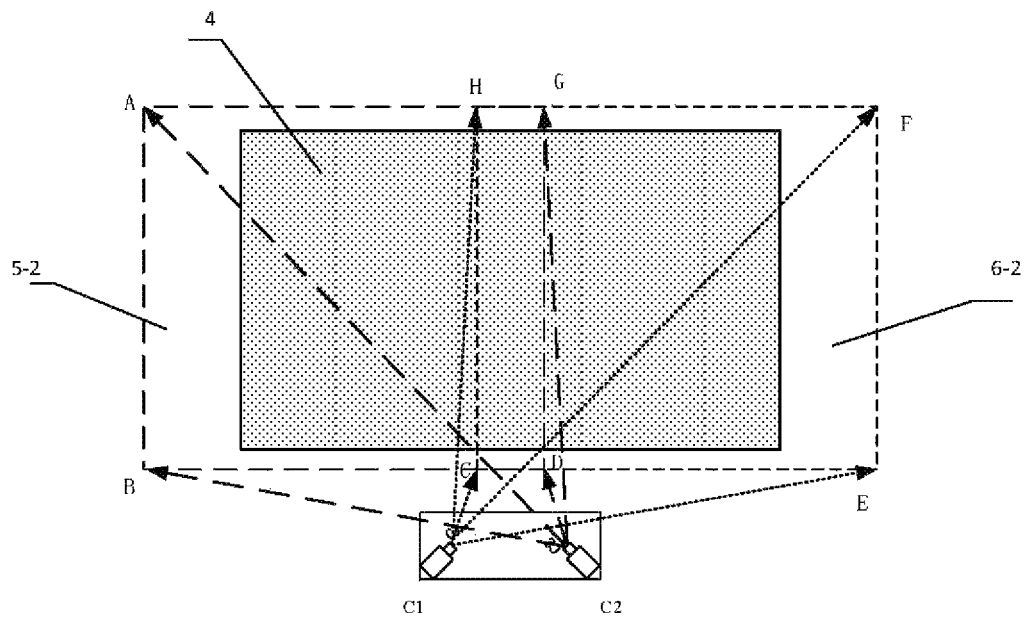
FIG. 4 is schematic diagram showing acquiring images of areas on the opposite side by double cameras, according to an embodiment of this application.

In another achievable implementation mode, as shown in FIG. 4, FIG. 4 is a schematic diagram showing acquiring images of areas on the opposite side by double cameras, according to an embodiment of this application, the two cameras are used to acquire the images of the areas on the opposite side, to obtain a first lateral projection image and a second lateral projection image. As CEFH is a shooting area 5-2 of a camera C1, ABDG is a shooting area 6-2 of a camera C2, and a projection picture area 4 covers two sides of a screen area 1, according to the first lateral projected image, namely an image corresponding to CEFH, positions of two angular points on the right side of the screen may be obtained, and positions of two corresponding angular points E and F of a projection may also be obtained; or according to the second lateral projected image, namely an image corresponding to ABDG, positions of two angular points on the left side of the screen may be obtained, and positions of two corresponding angular points A and B of a projection may also be obtained. It can be understood that, the size of the first lateral projected image and the second lateral projected image is not limited in the embodiment, as long as they include the corresponding feature points, which facilitates acquisition of the screen position and the projection position.

As an example embodiment, before acquiring the first lateral projected image and the second lateral projected image by the two cameras when the ultra-short-throw projector projects a picture, the method further includes that an alignment instruction is received, wherein the alignment instruction includes a voice control alignment instruction. As an alternative embodiment, a user may push a start button, then a device reads the alignment instruction; or the user may send an instruction by voice, then the device reads a keyword in the voice to obtain a corresponding alignment instruction.

In S102, image processing is performed on the first lateral projected image and the second lateral projected image to obtain a projection position in a projection area and a screen position in a screen area.

The screen position and the projection position may be acquired from the first lateral projected image and the second lateral projected image by methods such as image segmentation and image feature point search. Here, the screen position includes positions of all corresponding angular points obtained in the two images.

In S103, the picture is adjusted according to the screen position and the projection position, so that a position of the adjusted projection picture and a target position coincide.

The target position includes, but is not limited to the position of the screen, a position of the ½ screen, a position of the ⅔ screen, and a position of the ¾ screen.

Related adjustment methods refer to the related art, which will not be elaborated in the embodiment. As an alternative embodiment, after adjusting the picture according to the screen position and the projection position, so that the position of the adjusted projection picture and the target position coincide, the method may further include that a deviation value between the position of the adjusted projection picture and the target position is calculated; whether the deviation value is smaller than a preset deviation threshold value is judged; and completion of alignment is determined when the deviation value is smaller than the preset deviation threshold value.

After the projection picture position and the target position coincide, in order to further ensure alignment accuracy of the picture and the screen, the deviation value between the projection position and the position of the screen is further calculated. As an example embodiment, when alignment of the picture and the screen is adjusted according to four angular points, an average value of deviation between the four angular points and the corresponding angular points of the screen is calculated. The average value is taken as the deviation value, to compare the deviation value with the preset deviation threshold value, so as to determine whether adjustment is completed.

Figure 5:
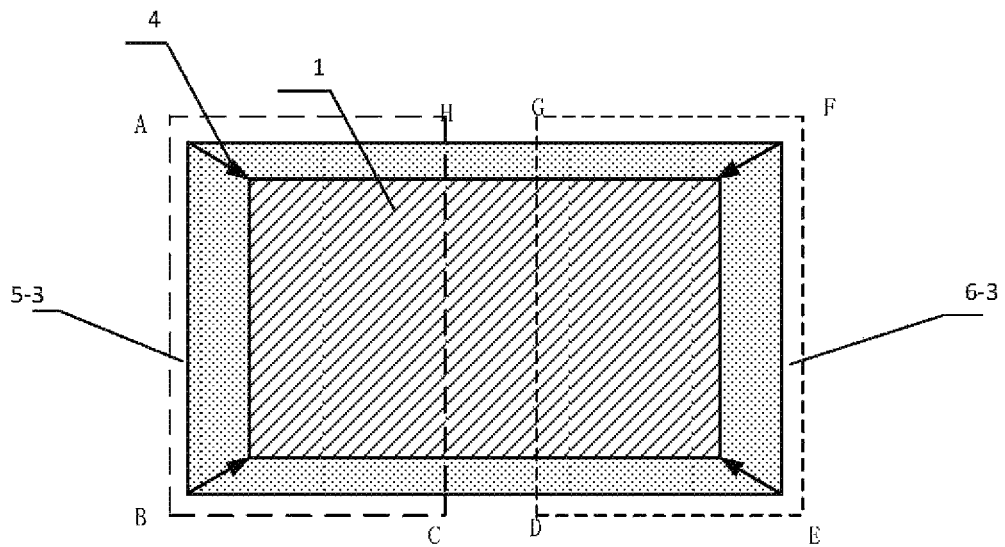
FIG. 5 is a schematic diagram of an image in which a projection area completely covers a screen, according to an embodiment of this application.

When the projection area completely covers the screen, after the projection position and the screen position are recognized, as shown in FIG. 5, FIG. 5 is a schematic diagram of an image in which a projection area completely covers a screen, according to an embodiment of this application, 5-3 is a shooting area of a camera C1, 6-3 is a shooting area of a camera C2, four angular points of a projection area 4 are sequentially adjusted to be coincided with a target position such as a screen position in a screen area 1, so that an adjustment process is completed.

Figure 6:
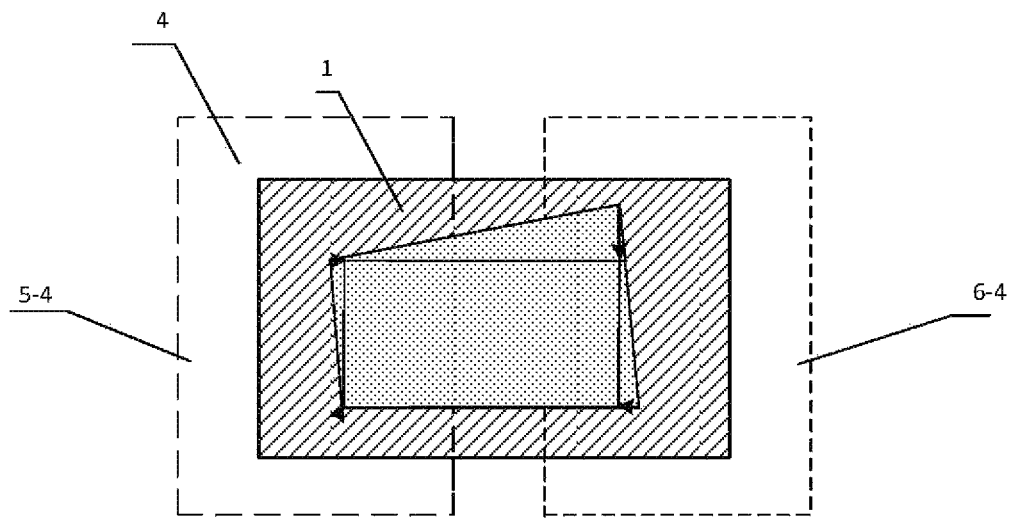
FIG. 6 is a schematic diagram of an image in which a projection area is within a screen, according to an embodiment of this application.
Figure 7:
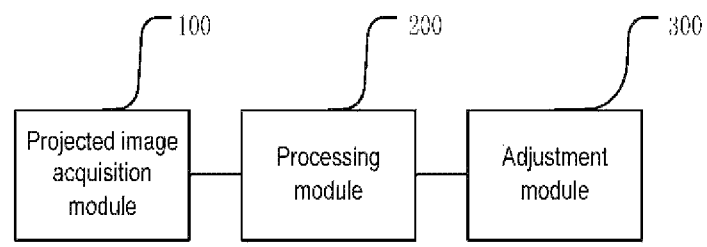
FIG. 7 is a structure diagram of an ultra-short-throw picture and screen alignment apparatus according to an embodiment of this application.

When the projection area is within the screen, after the projection area position and the screen position are recognized, as shown in FIG. 6, FIG. 6 is a schematic diagram of an image in which a projection area is within a screen, according to an embodiment of this application, 5-4 is a shooting area of a camera C1, 6-4 is a shooting area of a camera C2, vanishing points are obtained through the screen, a parallel line, relative to the boundary of the screen, of each side is calculated according to the vanishing points, and finally, an intersecting rectangle is taken, four angular points in the projection area 4 are sequentially adjusted to be coincided with a target position such as a screen position in a screen area 1, so that an adjustment process is completed.

When a part of the projection area is within the screen while the other part thereof is out of the screen, adjustment is performed in conjunction with the above two manners until that four angular points in the projection area are sequentially adjusted to be coincided with the target position, so that an adjustment process is completed.

Based on the above technical solution, according to the embodiment, the projected images are acquired by two cameras, thereby ensuring acquisition of complete images; the projection position and the screen position are obtained by cooperative processing, the picture is adjusted according to the projection position and the screen position, so that the incomplete picture caused by the use of a single camera in the related art is overcome, and both the accuracy in projection picture adjustment and the display effect are improved.

An ultra-short-throw picture and screen alignment apparatus according to an embodiment of this application is introduced as follows. The ultra-short-throw picture and screen alignment apparatus described below may mutually correspondingly refer to the ultra-short-throw picture and screen alignment method described above. Referring to FIG.

7, which is a structure diagram of an ultra-short-throw picture and screen alignment apparatus according to an embodiment of this application, the apparatus includes a projected image acquisition module 100, a processing module 200, and an adjustment module 300.

The projected image acquisition module 100 is configured to acquire a first lateral projected image and a second lateral projected image by two cameras when an ultra-short-throw projector projects a picture.

The processing module 200 is configured to perform image processing on the first lateral projected image and the second lateral projected image to obtain a projection position in a projection area and a screen position in a screen area.

The adjustment module 300 is configured to adjust the picture according to the screen position and the projection position, so that a position of an adjusted projection picture and a target position coincide.

As at least one alternative embodiment, the projected image acquisition module 100 includes a first projected image acquisition unit and a second projected image acquisition unit.

The first projected image acquisition unit is configured to respectively acquire a corresponding image of a same side area by two cameras to obtain the first lateral projected image and the second lateral projected image.

The second projected image acquisition is configured to respectively acquire a corresponding image of an opposite side area by two cameras to obtain the first lateral projected image and the second lateral projected image.

As at least one alternative embodiment, the picture is a small-scale feature image, wherein the small-scale feature image includes two feature images.

As at least one alternative embodiment, the feature image may include any one of a two-dimensional code image, a bar code image, and an ArUco image.

As at least one alternative embodiment, the apparatus further includes an instruction receiving module.

The instruction receiving module is configured to receive an alignment instruction, wherein the alignment instruction includes a voice control alignment instruction.

As at least one alternative embodiment, the apparatus further includes a calculation module, a judgment module, and a determination module.

The calculation module is configured to calculate a deviation value between a position of the adjusted projection picture and a target position.

The judgment module is configured to judge whether the deviation value is smaller than a preset deviation threshold value.

The determination module is configured to determine completion of alignment when the deviation value is smaller than the preset deviation threshold value.

As the embodiments of the ultra-short-throw picture and screen alignment apparatus mutually correspond to those of the ultra-short-throw picture and screen alignment method, the embodiments of the ultra-short-throw picture and screen alignment apparatus may refer to descriptions of the embodiments of the ultra-short-throw picture and screen alignment method, which will not be elaborated here.

An ultra-short-throw projection device according to an embodiment of this application is introduced as follows, and the ultra-short-throw projection device described below may mutually correspondingly refer to the ultra-short-throw picture and screen alignment method described above.

The embodiment provides an ultra-short-throw projection device which includes a memory and a processor.

The memory is configured to store a computer program.

The processor is configured to execute the computer program to implement the steps of the ultra-short-throw picture and screen alignment method described above.

As the embodiments of the ultra-short-throw projection device mutually correspond to those of the ultra-short-throw picture and screen alignment method, the embodiments of the ultra-short-throw projection device may refer to the descriptions of the embodiments of the ultra-short-throw picture and screen alignment method, which will not be elaborated here.

A computer-readable storage medium in one embodiment of this application is introduced as follows, and the computer-readable storage medium described below can mutually correspondingly refer to the ultra-short-throw picture and screen alignment method described above.

The embodiment provides a computer-readable storage medium. A computer program is stored on the computer-readable storage medium, and when executed by a processor, implements the steps of the ultra-short-throw picture and the screen alignment method described above.

As the embodiments of the computer-readable storage medium mutually correspond to those of the ultra-short-throw picture and screen alignment method, the embodiments of the computer-readable storage medium may refer to descriptions of the embodiments of the ultra-short-throw picture and screen alignment method, which will not be elaborated here.

The various embodiments in this specification are described in a progressive manner, each embodiment focuses on the differences from other embodiments, and the same or similar parts between the various embodiments can be referred to each other. For the device disclosed in the embodiments, since it corresponds to the method disclosed in the embodiments, the description is relatively simple, and the relevant part can refer to the description of the method part.

Professionals may further realize that the units and steps of each method of each example described in combination with the embodiments disclosed in the disclosure may be implemented by electronic hardware, computer software or a combination of the two. For clearly describing interchangeability of hardware and software, the composition points and steps of each example have been generally described according to functions in the above descriptions. Whether these functions are executed by hardware or software depends on specific applications and design constraints of the technical solutions. Professionals may realize the described functions for each specific application by use of different methods, but such realization shall fall within the scope of the application.

The steps of the method or algorithm described in the embodiments disclosed in the disclosure may be directly implemented by hardware, a software module for execution of a processor, or a combination of the two. The software module may be arranged in a Random Access Memory (RAM), an internal memory, a Read-Only Memory (ROM), an electrically programmable ROM, an electrically erasable programmable ROM, a register, a hard disk, a removable disk, a CD-ROM, or any other form of storage medium well known in the technical field.

The ultra-short-throw picture and screen alignment method, the ultra-short-throw picture and screen alignment apparatus, the ultra-short-throw projection device, and the computer-readable storage medium are described in detail above. The principle and implementations of this application are elaborated with specific examples in the disclosure, and the descriptions made to the embodiments are only adopted to help the method of this application and the core concept thereof to be understood. It should be pointed out that those of ordinary skill in the art may also make several improvements and modifications without departing from the principle of this application. These improvements and modifications shall fall within the scope of protection of the claims of this application.

What is claimed is:

1. An ultra-short-throw picture and screen alignment method, comprising:
   acquiring a first lateral projected image and a second lateral projected image by two cameras when an ultra-short-throw projector projects a picture;
   performing image processing on the first lateral projected image and the second lateral projected image to obtain a projection position in a projection area and a screen position in a screen area; and
   adjusting the picture according to the screen position and the projection position, so that a position of an adjusted projection picture and a target position coincide;
   wherein the picture is a small-scale feature image, wherein the small-scale feature image comprises two feature images, wherein the small-scale feature image is used to be subjected to homography transformation to obtain an original-size image, thereby facilitating picture and screen alignment.

2. The ultra-short-throw picture and screen alignment method according to claim 1, wherein acquiring the first lateral projected image and the second lateral projected image by the two cameras comprises:
   acquiring respectively a corresponding image of a same side area by two cameras to obtain the first lateral projected image and the second lateral projected image; or
   acquiring respectively a corresponding image of an opposite side area by two cameras to obtain the first lateral projected image and the second lateral projected image.

3. The ultra-short-throw picture and screen alignment method according to claim 2, after adjusting the picture according to the screen position and the projection position, so that the position of the adjusted projection picture and the target position coincide, the method further comprising:
   calculating a deviation value between the position of the adjusted projection picture and the target position;
   judging whether the deviation value is smaller than a preset deviation threshold value; and
   determining completion of alignment when the deviation value is smaller than the preset deviation threshold value.

4. The ultra-short-throw picture and screen alignment method according to claim 1, wherein the feature image comprises any one of a two-dimensional code image, a bar code image, and an ArUco image.

5. The ultra-short-throw picture and screen alignment method according to claim 4, after adjusting the picture according to the screen position and the projection position, so that the position of the adjusted projection picture and the target position coincide, the method further comprising:
   calculating a deviation value between the position of the adjusted projection picture and the target position;
   judging whether the deviation value is smaller than a preset deviation threshold value; and
   determining completion of alignment when the deviation value is smaller than the preset deviation threshold value.

6. The ultra-short-throw picture and screen alignment method according to claim 1, before acquiring the first lateral projected image and the second lateral projected image by the two cameras when the ultra-short-throw projector projects the picture further, the method further comprising:
   receiving an alignment instruction, wherein the alignment instruction comprises a voice control alignment instruction.

7. The ultra-short-throw picture and screen alignment method according to claim 6, after adjusting the picture according to the screen position and the projection position, so that the position of the adjusted projection picture and the target position coincide, the method further comprising:
   calculating a deviation value between the position of the adjusted projection picture and the target position;
   judging whether the deviation value is smaller than a preset deviation threshold value; and
   determining completion of alignment when the deviation value is smaller than the preset deviation threshold value.

8. The ultra-short-throw picture and screen alignment method according to claim 1, after adjusting the picture according to the screen position and the projection position, so that the position of the adjusted projection picture and the target position coincide, the method further comprising:
   calculating a deviation value between the position of the adjusted projection picture and the target position;
   judging whether the deviation value is smaller than a preset deviation threshold value; and
   determining completion of alignment when the deviation value is smaller than the preset deviation threshold value.

9. The ultra-short-throw picture and screen alignment method according to claim 1, after adjusting the picture according to the screen position and the projection position, so that the position of the adjusted projection picture and the target position coincide, the method further comprising:
   calculating a deviation value between the position of the adjusted projection picture and the target position;
   judging whether the deviation value is smaller than a preset deviation threshold value; and
   determining completion of alignment when the deviation value is smaller than the preset deviation threshold value.

10. An ultra-short-throw picture and screen alignment apparatus, comprising:
    a projected image acquisition module, configured to acquire a first lateral projected image and a second lateral projected image by two cameras when an ultra-short-throw projector projects a picture;
    a processing module, configured to perform image processing on the first lateral projected image and the second lateral projected image to obtain a projection position in a projection area and a screen position in a screen area; and
    an adjustment module, configured to adjust the picture according to the screen position and the projection position, so that a position of an adjusted projection picture and a target position coincide;
    wherein the picture is a small-scale feature image, wherein the small-scale feature image comprises two feature images, wherein the small-scale feature image is used to be subjected to homography transformation to obtain an original-size image, thereby facilitating picture and screen alignment.

11. The ultra-short-throw picture and screen alignment apparatus according to claim 10, wherein the projected image acquisition module comprises:
- a first projected image acquisition unit, configured to acquire respectively a corresponding image of a same side area by two cameras to obtain the first lateral projected image and the second lateral projected image; and
- a second projected image acquisition unit, configured to acquire respectively a corresponding image of an opposite side area by two cameras to obtain the first lateral projected image and the second lateral projected image.

12. An ultra-short-throw projection device, comprising:
a memory, configured to store a computer program; and
a processor, configured to execute the computer program to implement the following steps of the ultra-short-throw picture and the screen alignment method:

acquiring a first lateral projected image and a second lateral projected image by two cameras when an ultra-short-focus projector projects a picture;

performing image processing on the first lateral projected image and the second lateral projected image to obtain a projection position in a projection region and a curtain position in a curtain region; and adjusting the picture according to the curtain position and the projection position, so that a position of an adjusted projection picture and a target position coincide;

wherein the picture is a small-scale feature image, wherein the small-scale feature image comprises two feature images, wherein the small-scale feature image is used to be subjected to homography transformation to obtain an original-size image, thereby facilitating picture and screen alignment.

\* \* \* \* \*